United States Patent [19]

Morritt et al.

[11] Patent Number: 5,230,544

[45] Date of Patent: Jul. 27, 1993

[54] PIVOTAL SEAT CONSTRUCTION FOR VEHICLES

[76] Inventors: Stanley W. Morritt; Cecile K. Morritt, both of 124 Cliff Dr., Gray, Tenn. 37615-2504

[21] Appl. No.: 826,441

[22] Filed: Jan. 27, 1992

[51] Int. Cl.⁵ .................................................. B60N 2/14
[52] U.S. Cl. .............................. 296/65.1; 296/37.16; 296/37.3; 297/326; 297/336; 292/278; 292/338; 224/42.2
[58] Field of Search .................. 296/65.1, 37.2, 37.3, 296/37.16; 297/325–328, 335, 336; 292/258, 278, 338, 339; 224/42.2

[56] References Cited

U.S. PATENT DOCUMENTS

| 1,957,004 | 5/1934 | Smith | 297/325 |
|---|---|---|---|
| 2,547,083 | 4/1951 | Lundgren | 296/37.2 X |
| 2,565,666 | 8/1951 | Schaefer | 297/326 X |
| 4,070,050 | 1/1978 | Glock et al. | 292/339 |
| 4,307,907 | 12/1981 | Barrowman et al. | 292/339 |
| 4,565,407 | 1/1986 | Brautigam | 297/335 |
| 4,696,508 | 9/1987 | Brautigam | 296/65.1 |
| 4,925,229 | 5/1990 | Siebler | 296/65.1 |

FOREIGN PATENT DOCUMENTS

| 2719876 | 11/1978 | Fed. Rep. of Germany | 292/338 |
|---|---|---|---|
| 548425 | 1/1923 | France | 297/327 |
| 158425 | 2/1921 | United Kingdom | 297/335 |
| 1437507 | 5/1976 | United Kingdom | 292/338 |

Primary Examiner—Dennis H. Pedder

[57] ABSTRACT

A transport modification for a vehicle such as a van having a rearmost seat means pivotally mounted a position proximate one forward edge portion thereof to the vehicle floor and pivotal over a storage space located normally substantially underneath the seat, the modification including a tote deck adapted to overlie the space and providing a substantially flat and generally horizontal support surface for baggage or the like, a foot member affixed to each end portion of the tote deck for spanning the space and adapted to rest on the floor for maintaining the support surface of the deck above the space and substantially parallel to the floor, and at least one removable prop adapted for rigidly connecting the floor to the other edge portion of the seat to maintain the seat in a pivoted position with respect to the tote deck during the period that accessibility to the storage space is desired.

6 Claims, 2 Drawing Sheets

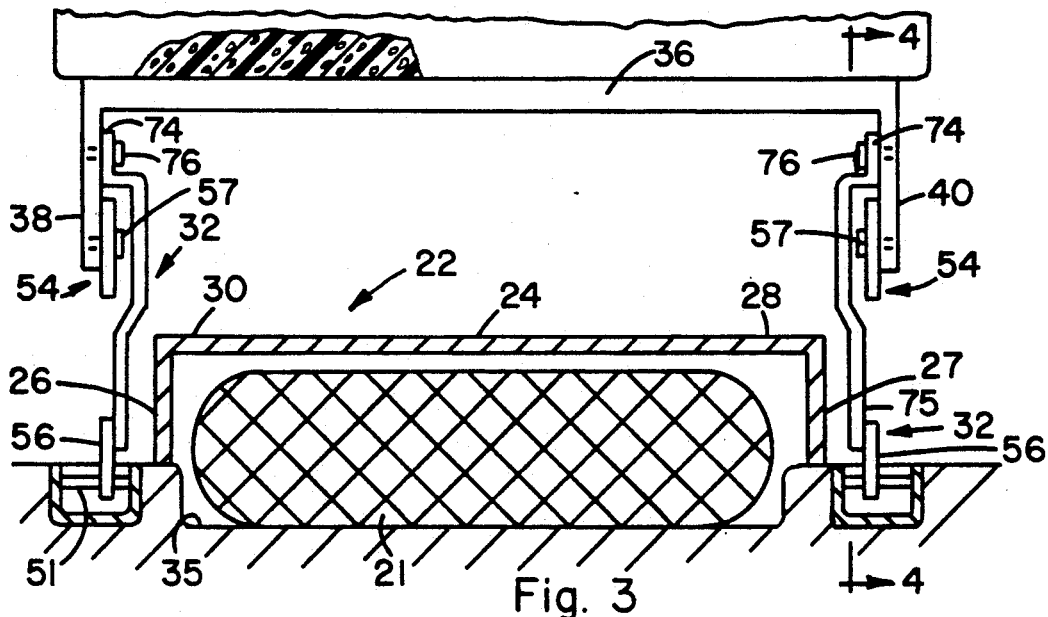
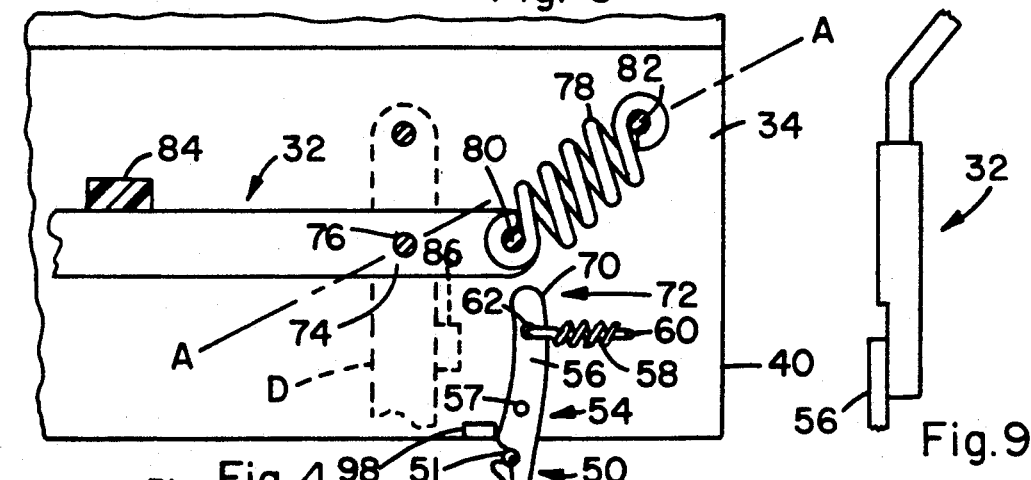
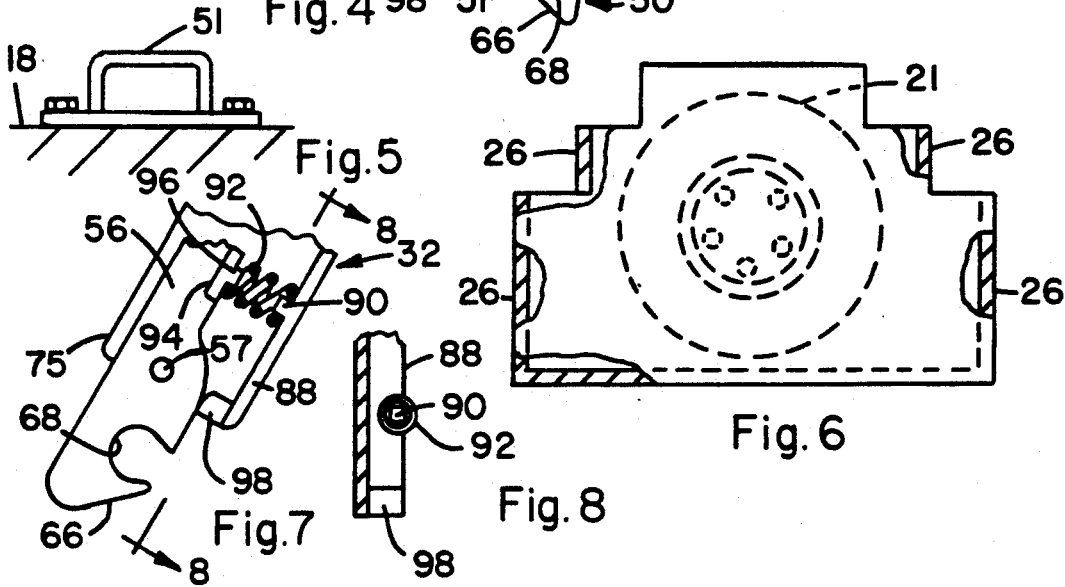

PIVOTAL SEAT CONSTRUCTION FOR VEHICLES

FIELD OF THE INVENTION

This invention concerns vehicles having an upwardly or forwardly pivotal seat, particularly vehicles in which a storage space is provided under the seat and in which a spare tire or the like is stored. Typically the rearmost seat adjacent a tail gate or hatch door is the seat herein involved, and the invention especially concerns modifications which greatly enhance the accessibility to the storage space, and in concert therewith, can also provide deck means within the storage space for improving the utilization thereof.

In many vehicles, especially automotive vehicles of the van type, the rear seat is pivotally mounted at its front portion on the vehicle floor such that it can be pivoted in a forward arc a sufficient distance to expose the space thereunder in which a spare tire (includes the rim) is stored. Typically, this pivotal relocation of the seat is only for the purpose of gaining access to the spare tire and therefore, no particular structure is provided for maintaining the seat in its upwardly or forwardly pivoted position. In this regard, with the seat pivoted upwardly by one hand, theoretically the tire can easily be removed or replaced with the other hand. In many instances however, this operation is much too difficult for one person to readily handle.

OBJECTS OF THE INVENTION

Objects therefore of the present invention are: to modify the construction of an upwardly or forwardly pivotal vehicle seat to provide a convenient means for maintaining the seat in its pivoted position for enhancing the accessibility of the space thereunder; and to provide a transport means for better utilizing said space for carrying items, without removing either the seat or a spare tire or the like stored thereunder.

BRIEF SUMMARY OF THE INVENTION

These and other objects hereinafter appearing have been attained in accordance with the present invention which is defined in one of its preferred embodiments as a transport modification for a vehicle having seat means pivotally mounted proximate one edge portion thereof to floor means of said vehicle and pivotal over a storage space located normally substantially underneath said seat means, said modification comprising deck means adapted to overlie said space and providing a substantially flat and generally horizontal support surface, foot means affixed to opposite end portions of said deck means for spanning said space and adapted to rest on said floor means for maintaining said support surface of said deck means above said space and substantially parallel to said floor means, and removable prop means adapted for rigidly connecting said floor means to the other edge portion of said seat means for maintaining said seat means in a pivoted position with respect to said deck means during the period that accessibility to said storage space is desired.

In certain preferred embodiments:

(a) one end of said prop means is pivotally affixed to said seat means for pivotal retraction to an unobtrusive position on said seat means when not in use, and wherein the other end of said prop means is provided with one component of a releasable catch means, said component being adapted to interlock with a cooperating component of said catch means mounted on said floor means;

(b) said foot means comprises wall means on each end of said deck means and oriented generally longitudinally of said vehicle, and adapted to straddle said storage space or an item stored therein; and (c) each end of said seat means is provided with substantially vertically oriented wall shaped base means, each said base means also being provided with one component of a releasable catch means, said component being adapted to interlock with a cooperating component of said catch means mounted on said floor means.

The invention will be further understood from the following description and drawings which are not to scale and wherein:

FIG. 3 is a rear view of the present modification, with the vehicle rear door or hatch removed, taken in the direction of arrow 3 in FIG. 2, with portions broken away or in cross-section for clarity, and showing the present prop means in operating position;

FIG. 4 is a cross-sectional view of the seat taken along line 4—4 of FIG. 3 in the direction of the arrows but with the seat in its down position and anchored to the floor, and with the prop means in its stored position;

FIG. 5 is an elevational view of a modification of the catch means component or hook mounted on top of the vehicle floor;

FIG. 6 is a partially cross-sectioned top view of another configuration embodiment of the present tote deck;

FIG. 7 is an enlarged clarification view of the latch arm for the prop means of FIG. 2;

FIG. 8 is a cross-sectional view of the latch arm taken along line 8—8 of FIG. 7 in the direction of the arrows; and FIG. 9 is a longitudinal elevational view of a useful type of telescoping prop means.

Figure 1:
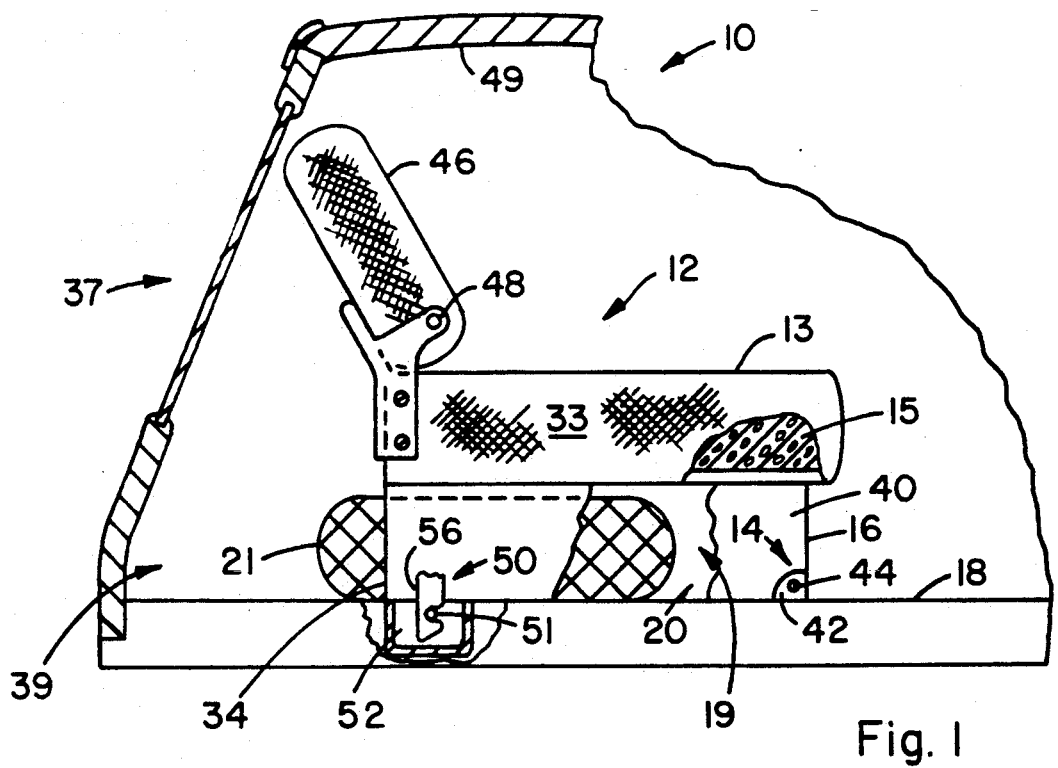
FIG. 1 is a side view, partially in cross-section, of the rear portion of a vehicle body with the side panel removed to show the general lay-out of a typical vehicle pivotal seat in its down position with respect to the spare tire and floor.

Referring to the drawings, and with reference to the claims hereof, in a vehicle generally designated 10 having rear tailgate 37, seat means 12 pivotally mounted at 14 proximate its forward or one edge portion 16 to floor means 18 of said vehicle and pivotal over the forward portion 19 of a storage space 20 which may contain a spare tire 21 or the like positioned substantially flat on said floor means normally substantially underneath said seat means, a transport modification is provided comprising deck means 22 adapted to overlie said storage space including said forward portion 19 and rearward portion 39 and including a substantially flat and generally horizontal support surface 24, foot means 26 and 27 affixed to opposite end portions 28 and 30 of said deck means for spanning said space and adapted to rest on said floor means for maintaining said support surface 24 above said space and substantially parallel to said floor means, and prop means 32 for rigidly connecting said floor means to a rearward or other edge portion 34 of said seat means to maintain said seat means in an upwardly or forwardly pivoted position with respect to said deck means.

The vehicle, i.e., whether it be a van, station wagon or the like to which the present invention is applicable, may, of course, be widely varied, the important aspect being that it is provided with a pivotal seat and a storage compartment or space located substantially thereunder. It is noted that in some vehicles, the storage space may include a well 35 such as shown in FIG. 3 into which a spare tire can be placed so as not to protrude too far above the floor surface as to interfere with the seat or its mounting structure. A typical vehicle for which the present invention is eminently suited is the "Plymouth Voyager LX", 1991.

The seat 12 having a cushion 13 typically of rectangular configuration and having a fabric or vinyl covering over cushion material 15 such as elastomer foam, spring means, or the like, is provided preferably with a supporting frame or base generally designated 36 having substantially vertically oriented end walls 38 and 40, preferably of heavy sheet metal. The pivotal mountings 14 for the seat may be any type which can afford stability and strength, such as brackets 42 welded to the vehicle floor at each end of the seat, and stud axles 44 welded to walls 38, 40 and rotatably mounted through said brackets. These pivots may also be constructed in known manner, e.g., slots or the like, to allow easy removal of the seat. The seat 12 may be provided with a back rest 46, preferably pivotally connected as at 48 thereto or to frame 36 to allow clearance of the back rest with the vehicle roof 49 during upward or downward pivoting of the seat.

The seat is typically affixed in its down position to the vehicle floor by means of releasable catch means generally designated 50 at each end of the seat, each catch means comprising, in the exemplarly, but by no means exclusive, embodiment shown, a hook component 51 secured in any suitable manner either in a socket 52 in the floor or simply affixed to and projecting above the floor as shown in FIG. 5, and a cooperating latch component generally designated 54 of any configuration and construction which affords a latch type arm 56 or equivalent pivotally mounted by pin 57 to 34, and which can lock under hook component 51 to firmly anchor the seat to the floor. A spring mechanism such as coiled extension spring 58 or equivalent mounted at one end on pin 60 fixed to wall portion 34 and at its other end through aperture 62 in arm 56 constantly urges the arm toward stop 64 on wall portion 34 such that downward pivotal travel of the seat will engage cam surface 66 of the arm with hook 51 to rotate the arm counterclockwise until recess 68 in the arm becomes registered with hook 51 whereupon the tensional force of spring 58 will snap the arm into its interlocked position on hook 51 as shown in FIG. 4. When it is desired to release this catch means, hand pressure against the upper portion 70 of arm 56 in the direction of arrow 72 will disengage recess 68 from hook 51 and allow the seat to be pivoted forwardly around the front pivots 14.

It is noted that hook component 51 and arm 56 may be reversed in positions, i.e., the hook can be on the seat, and the arm can be mounted on the floor, depending, e.g., on available space. Also, many varieties of such releasable catches are known in the automotive and related mechanical fields and may be used in practising the present invention.

Figure 2:
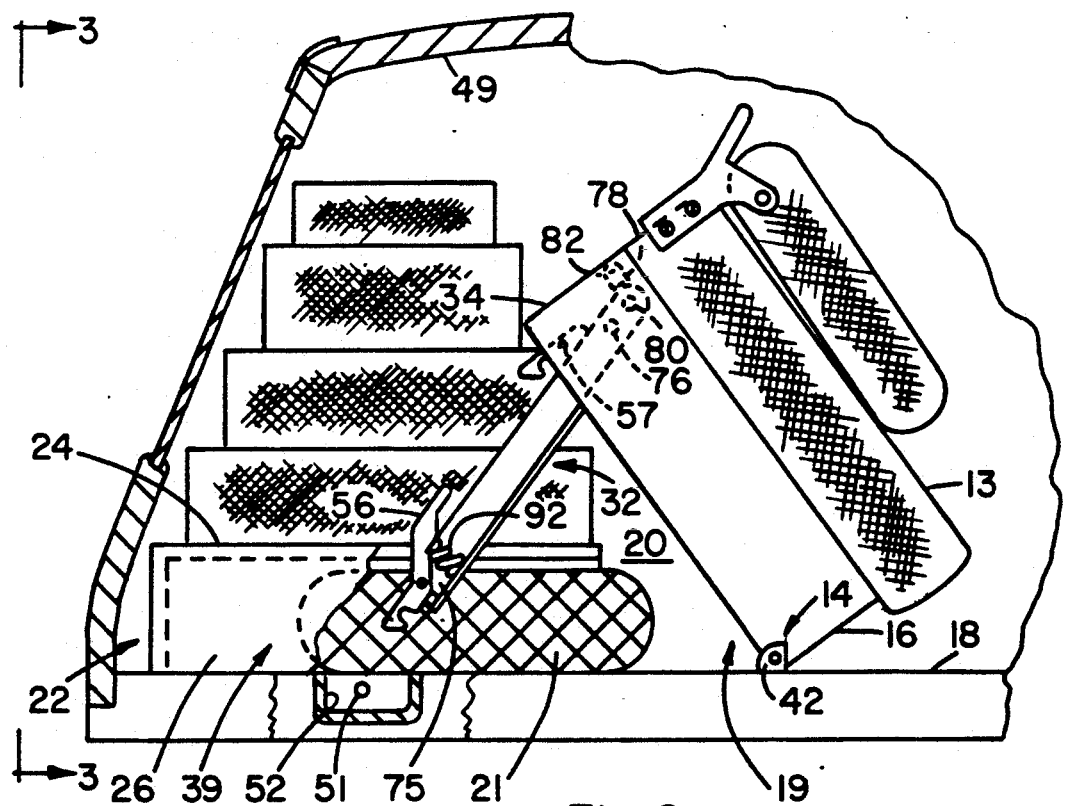
FIG. 2 is a view as in FIG. 1 with the seat in its forwardly pivoted position with the present prop means and tote deck in operating position.

The prop means generally designated 32 may be employed at only one, but preferably at both ends generally designated 31 and 33 of the seat, and may be separately handleable elements. Preferably, however, the prop means are pivotally affixed at one end 74 to the rearward portions 34 of walls 38 and 40, either on the insides thereof as shown or on the outside thereof or to the floor, by suitable connecting means such as stud or bolt means 76 or any equivalent thereof. These props preferably are configured as shown in FIG. 3 such that they can be pivoted upwardly along walls 38 and 40 past each latch member 54 for storage when not in use. For this purpose, and as an exemplary mechanism, an overcentering compression spring 78 is pivotally affixed to pin 80 on the end of each prop and to pin 82 to each wall portion 34 such that when the prop is pivoted upwardly around pivot stud 76 from its dotted outline down position "D"; spring 78 will first compress and then overcenter beyond its axis A—A as shown in FIG. 4 and force prop 32 upwardly and tightly against rubber stop 84 for quiet but firm storage. Likewise, downward pivoting of the prop will overcenter spring 78 and force the prop tightly against stop 86 which is affixed on the wall such that surface 66 of latching arm 56 pivotally mounted by pin 57 to the other end 75 of the prop will properly align with hook component 51. In this regard, the connecting means such as releasable catch means used on the prop may be identical or equivalent in structure and operation to the releasable catch means 50 used for seat 12 as shown in FIGS. 2 and 4. It is noted that separate hook components 51 may be provided for situations where the props cannot be conveniently mounted on the walls or other portions of the seat such that the latch arms 56 thereof are readily alignable with the same hooks 51 as used for the catch means on the seat.

Referring to FIGS. 7 and 8, the prop 32 may be formed with a flange portion 88 providing a nib 90 around which one end of compression spring 92 conveniently can be affixed in position. Likewise, arm 56 may be formed with a flange portion 94 providing nib 96 around which the other end of spring 92 can be affixed. A stop 98 on prop 32, in combination with spring 92, maintains arm 56 of the prop aligned position with respect to hook 51. This prop may be made in a variety of forms, e.g., telescoping tubular sections, hinged sections, sliding internesting channel sections, or the like to provide enhanced storage facility or the like.

The transport means or deck means generally designated 22 may be of any suitable material such as plywood, formed plastic, sheet metal or the like and may be covered or cushioned by carpeting or other decorative material. It is preferably light weight such that it can be handled easily and quickly placed in position within the vehicle or quickly removed therefrom. Its shape will depend of course on the configuration and dimensions of the storage space 20 and any surrounding space. A representative configuration for the deck is shown in FIG. 6, again however, its precise shape being dependent on customer choice and vehicle design.

This invention has been described in detail with particular reference to preferred embodiments thereof, but it will be understood that variations and modifications will be effected within the spirit and scope of the invention.

We claim:

1. A transport modification for a vehicle having seat means having a forward edge portion, a rearward edge portion, and opposite end means and being pivotally mounted proximate said forward edge portion thereof to floor means of said vehicle and upwardly and downwardly pivotal over a forward portion of a storage space located normally at least partially underneath said seat means, said vehicle having a rear tailgate spaced from the rear of said seat means and delimiting with said seat means a rearward portion of said storage space, said modification comprising deck means adapted to overlie at least a major portion of said storage space, said deck means having opposite end portions and a support surface extending from beneath said seat means to adjacent said tailgate, foot means affixed to said opposite end portions of said deck means and spanning said storage space and adapted to rest on said floor means for maintaining said support surface of said deck means above said storage space and said floor means, and elongated prop means having opposite end means each provided with connecting means, one of which connecting means is carried by one of said floor means and said seat means, said prop means being adapted for movement to a position for engaging the other of its connecting means with one of said floor means and said seat means for connecting said floor means to said rearward edge portion of said seat means to maintain said seat means in an upwardly pivoted position with respect to said deck means during the period that accessibility to said storage space is desired.

2. The modification of claim 1 wherein said one of said connecting means of said prop means is pivotally affixed to said seat means for pivotal retraction to an unobtrusive position on said seat means when not in use, and wherein said other of said connecting means of said prop means comprises one component of a releasable catch means, said one component being adapted to interlock with a cooperating component of said catch means mounted on said floor means.

3. The modification of claim 2 wherein said foot means comprises wall means on each end of said deck means and oriented generally longitudinally of said vehicle, and adapted to straddle said storage space or an item stored therein.

4. The modification of claim 2 wherein each end means of said seat means is provided with substantially vertically oriented wall shaped base means, each said base means also being provided with one component of a releasable catch means, said one component being adapted to interlock with said cooperating component of said catch means mounted on said floor means.

5. The modification of claim 4 wherein said cooperating component of said catch means on said floor means is common to each of said releasable catch means of said prop means and said seat means.

6. The modification of claim 1 wherein the length of said prop means is adjustable.

* * * * *